United States Patent
Didjusto et al.

(10) Patent No.: US 9,677,886 B2
(45) Date of Patent: Jun. 13, 2017

(54) METHOD AND APPARATUS FOR NAVIGATION BASED ON MEDIA DENSITY ALONG POSSIBLE ROUTES

(71) Applicant: QUALCOMM Incorporated, San Diego, CA (US)

(72) Inventors: Damir Didjusto, San Diego, CA (US); Shriram Ganesh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 13/763,728

(22) Filed: Feb. 10, 2013

(65) Prior Publication Data

US 2014/0229107 A1 Aug. 14, 2014

(51) Int. Cl.
*G01C 21/00* (2006.01)
*G01C 21/36* (2006.01)
*G01C 21/34* (2006.01)

(52) U.S. Cl.
CPC ......... *G01C 21/00* (2013.01); *G01C 21/3476* (2013.01); *G01C 21/3679* (2013.01); *G01C 21/343* (2013.01); *G01C 21/3644* (2013.01); *G01C 21/3682* (2013.01)

(58) Field of Classification Search
CPC ............ G01C 21/3476; G01C 21/3679; G01C 21/3605; G01C 21/3682; G01C 21/3667; G01C 21/3644; G01C 21/3626; G01C 21/36; G01C 21/34; G01C 21/343; G01C 21/00
USPC ....... 701/410, 420, 411, 415, 416, 418, 423, 701/425, 426, 438, 467; 340/990
See application file for complete search history.

(56) References Cited

U.S. PATENT DOCUMENTS

| | | | | | |
|---|---|---|---|---|---|
| 5,948,040 | A * | 9/1999 | DeLorme | ............... | G01C 21/36 340/990 |
| 6,259,987 | B1 * | 7/2001 | Ceylan | ............... | G01C 21/3611 340/990 |
| 7,281,021 | B2 * | 10/2007 | Shiota | ............... | H04N 1/00132 382/175 |
| 7,353,109 | B2 * | 4/2008 | Han | ............... | G01C 21/36 340/995.1 |
| 7,383,130 | B1 * | 6/2008 | Koosam | ............... | G01W 1/00 702/3 |
| 8,301,371 | B2 * | 10/2012 | Sheha | ............... | G01C 21/3679 701/426 |
| 8,352,465 | B1 * | 1/2013 | Jing | ............... | G06F 17/30867 707/723 |

(Continued)

OTHER PUBLICATIONS

Schaffalitzky, Explore more with User Photos in Street View, Feb. 25, 2009, Google Maps Blog, https://maps.googleblog.com/2009/02/explore-more-with-user-photos-in-street.html.*

(Continued)

*Primary Examiner* — Thomas G Black
*Assistant Examiner* — Sara Lewandroski
(74) *Attorney, Agent, or Firm* — MG-IP Law, P.C.

(57) ABSTRACT

The disclosure is directed to routing to a destination. An aspect determines a route from an origin to the destination, and recommends a location of interest. The location of interest is a location with a media density score is greater than a threshold and within a range of deviation from the route. The media density score is based on a number of recommendations of a media file related to the media density score.

48 Claims, 8 Drawing Sheets

(56) References Cited

U.S. PATENT DOCUMENTS

| | | | | |
|---|---|---|---|---|
| 8,401,786 B2* | 3/2013 | Poppen | G01C 21/3476 | 340/438 |
| 8,566,433 B2* | 10/2013 | Soelberg | G06F 17/30241 | 455/404.2 |
| 8,583,365 B2* | 11/2013 | Jang | G01C 21/3476 | 340/995.14 |
| 8,594,715 B1* | 11/2013 | Stewart | G06Q 50/01 | 370/310 |
| 8,621,374 B2* | 12/2013 | Sheha | G01C 21/3664 | 701/532 |
| 8,669,884 B2* | 3/2014 | Beyeler | G01C 21/3682 | 340/995.1 |
| 8,700,321 B2* | 4/2014 | Studzinski | G01C 21/32 | 701/438 |
| 8,751,507 B2* | 6/2014 | Kim | G06F 17/30699 | 707/706 |
| 8,768,379 B2* | 7/2014 | Busch | H04W 4/02 | 370/338 |
| 8,774,839 B2* | 7/2014 | Busch | H04W 4/02 | 370/338 |
| 8,786,469 B2* | 7/2014 | Sheha | G01C 21/36 | 340/539.13 |
| 8,787,960 B2* | 7/2014 | Stewart | G06Q 50/01 | 370/310 |
| 8,949,253 B1* | 2/2015 | Jing | G06F 17/3028 | 707/723 |
| 2002/0183072 A1* | 12/2002 | Steinbach | G06F 17/3087 | 455/456.1 |
| 2003/0036848 A1 | 2/2003 | Sheha et al. | | |
| 2003/0182052 A1* | 9/2003 | DeLorme | G01C 21/26 | 701/533 |
| 2006/0089788 A1* | 4/2006 | Laverty | G01C 21/3679 | 701/426 |
| 2008/0076451 A1* | 3/2008 | Sheha | G01C 21/3679 | 455/456.3 |
| 2008/0248815 A1* | 10/2008 | Busch | | 455/456.5 |
| 2009/0063561 A1* | 3/2009 | Sayko | G06F 17/30038 | |
| 2009/0143977 A1* | 6/2009 | Beletski | G01C 21/362 | 701/533 |
| 2009/0150376 A1* | 6/2009 | O'Callaghan | G06K 9/6232 | |
| 2009/0240429 A1* | 9/2009 | Tanaka | G01C 21/3682 | 701/533 |
| 2010/0027527 A1* | 2/2010 | Higgins | H04W 4/18 | 370/351 |
| 2010/0121566 A1* | 5/2010 | Joshi | G01C 21/3461 | 701/533 |
| 2010/0145608 A1* | 6/2010 | Kurtti | G01C 21/20 | 701/533 |
| 2010/0161718 A1* | 6/2010 | Soelberg et al. | | 709/203 |
| 2010/0211304 A1* | 8/2010 | Hwang | G01C 21/3484 | 701/532 |
| 2011/0077848 A1* | 3/2011 | Xiao | G01C 21/343 | 701/532 |
| 2011/0202267 A1 | 8/2011 | Amer-Yahia et al. | | |
| 2011/0238762 A1* | 9/2011 | Soni | G01C 21/3679 | 709/206 |
| 2012/0016577 A1* | 1/2012 | Kim | G01C 21/3476 | 701/516 |
| 2012/0064919 A1* | 3/2012 | Purdy | G06Q 50/01 | 455/456.3 |
| 2012/0084000 A1 | 4/2012 | Wang et al. | | |
| 2012/0123678 A1 | 5/2012 | Poppen et al. | | |
| 2012/0197524 A1 | 8/2012 | Beyeler et al. | | |
| 2012/0271541 A1* | 10/2012 | Hjelm | G01C 21/3484 | 701/410 |
| 2013/0006521 A1* | 1/2013 | Needham | G01C 21/343 | 701/426 |
| 2013/0024203 A1* | 1/2013 | Flores | G06Q 30/02 | 705/1.1 |
| 2013/0073988 A1* | 3/2013 | Groten | G06Q 30/02 | 715/753 |
| 2013/0103697 A1* | 4/2013 | Hill | G06F 17/30312 | 707/748 |
| 2013/0137463 A1* | 5/2013 | Busch | H04W 4/02 | 455/456.3 |
| 2013/0246409 A1* | 9/2013 | Polansky | G06F 17/30268 | 707/724 |
| 2013/0252591 A1* | 9/2013 | Sasaki | H04W 4/001 | 455/414.1 |
| 2013/0261957 A1* | 10/2013 | Mahapatro | G01C 21/343 | 701/426 |
| 2013/0262479 A1* | 10/2013 | Liang | G06F 17/3053 | 707/748 |
| 2013/0282283 A1* | 10/2013 | Bondesen | H04W 12/06 | 701/537 |
| 2013/0337830 A1* | 12/2013 | Haro | H04W 4/02 | 455/456.1 |
| 2013/0345958 A1* | 12/2013 | Paek | G01C 21/3679 | 701/400 |
| 2014/0032109 A1* | 1/2014 | Hsieh | G01C 21/34 | 701/533 |
| 2014/0032678 A1* | 1/2014 | Koukoumidis | G06F 17/30867 | 709/205 |
| 2014/0062790 A1* | 3/2014 | Letz | H04L 67/1095 | 342/386 |
| 2014/0067955 A1* | 3/2014 | Christian | H04W 4/02 | 709/204 |
| 2014/0108307 A1* | 4/2014 | Raghunathan | G06N 99/005 | 706/12 |
| 2014/0133756 A1* | 5/2014 | Bergboer | G06K 9/00677 | 382/190 |
| 2014/0218394 A1* | 8/2014 | Hochmuth | G09G 5/377 | 345/629 |
| 2014/0229107 A1* | 8/2014 | Didjusto | G01C 21/00 | 701/537 |
| 2017/0059338 A1* | 3/2017 | Sofinski | G01C 21/3676 | |

OTHER PUBLICATIONS

International Search Report and Written Opinion—PCT/US2014/015009—ISA/EPO—Jun. 11, 2014.

* cited by examiner

METHOD AND APPARATUS FOR NAVIGATION BASED ON MEDIA DENSITY ALONG POSSIBLE ROUTES

BACKGROUND

This disclosure is related to navigating based on media density along possible routes.

Mobile devices (also referred to as user equipment (UEs)) are typically capable of determining their position within a certain degree of accuracy. When available, UEs generally rely on global positioning system (GPS) signals to determine their position. A UE may also execute a navigation application that guides a user from an origin location to a destination location. Such a UE is typically a mobile device, such as a cell phone, a smart phone, a personal digital assistant (PDA), a tablet computer, an automotive navigation system, or the like. The origin location may be the current location of the UE or another identified location. The navigation application uses the continuously determined position of the UE and a map of the area comprising the origin location and the destination location to provide the user with turn-by-turn directions to the destination location. The UE may display the entire route or just the area immediately around the UE's position.

Conventional navigation applications typically include a point of interest (POI) database. While travelling along the route, the user can be presented with POIs immediately adjacent to the route. These POIs are typically presented as icons representing the category of POI, such as food, gas, hotel, attraction, and the like. However, there may be many more POIs near the route that are not displayed because they are not adjacent to the route or do not fit into any of the predefined categories. A user may have no way of knowing about these other POIs along the route. Further, the POIs that are displayed are typically not distinguished from each other according to popularity.

SUMMARY

This disclosure is directed to routing to a destination. An aspect determines a route from an origin to the destination, and recommends a location of interest. In one implementation, the location of interest is a location with a media density score greater than a threshold and within a range of deviation from the route. In one aspect, the media density score is based on a number of recommendations of a media file related to the media density score.

BRIEF DESCRIPTION OF THE DRAWINGS

A more complete appreciation of aspects of the described subject matter and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
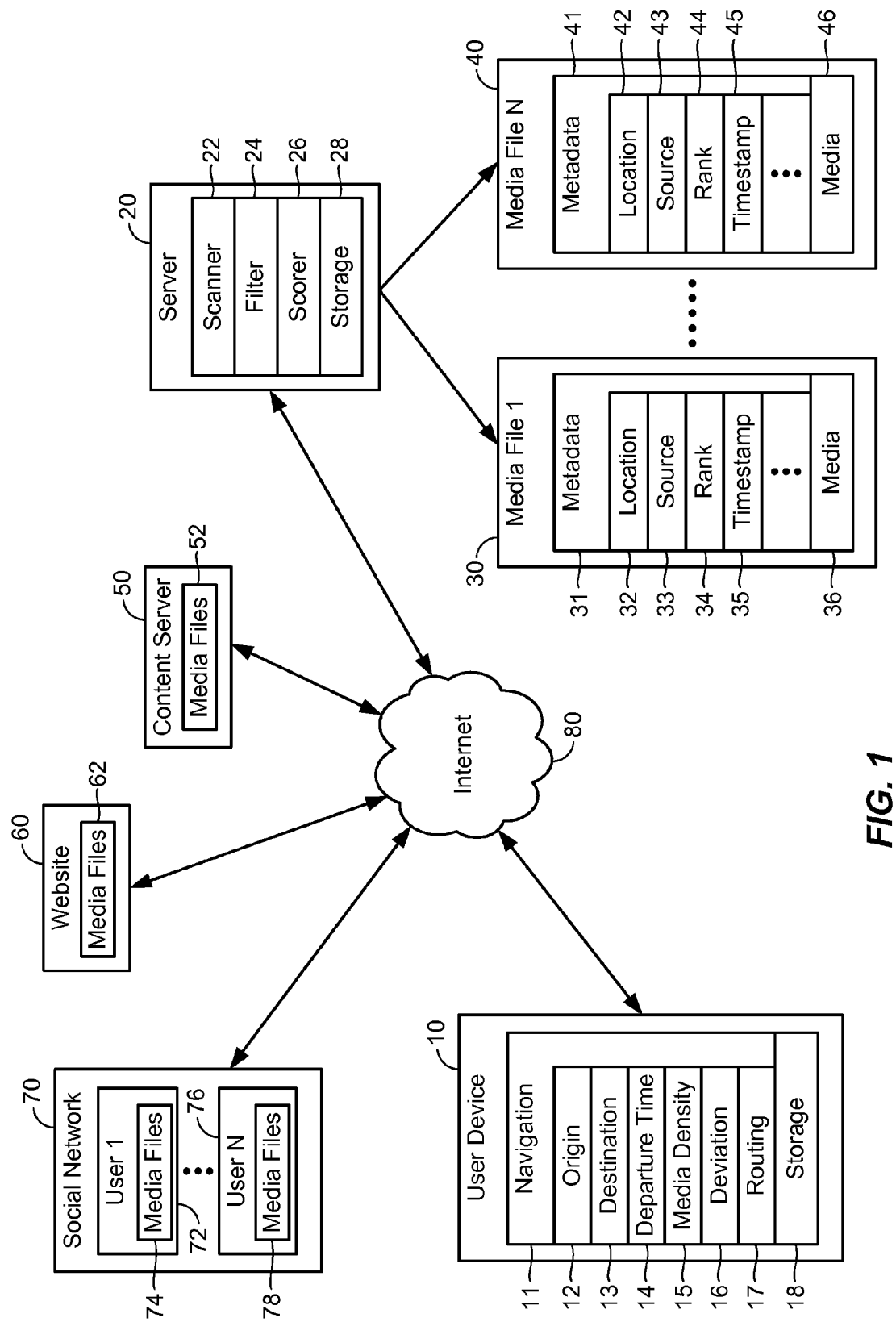
FIG. 1 illustrates a high-level system overview according to an aspect.

Aspects of the disclosure are disclosed in the following description and related drawings directed to specific aspects of the disclosed subject matter. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the terms "aspects of the disclosure" or "implementations of the disclosure" do not require that all aspects or implementations of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on.

UEs are typically capable of determining their position within a certain degree of accuracy. When available, UEs generally rely on global positioning system (GPS) signals to determine their position. A UE may also execute a navigation application that guides a user from an origin location to a destination location. Such a UE is typically a mobile device, such as a cell phone, a smart phone, a personal digital assistant (PDA), a tablet computer, an automotive navigation system, or the like. The origin location may be the current location of the UE or another identified location. The navigation application uses the continuously determined position of the UE and a map of the area comprising the origin location and the destination location to provide the user with turn-by-turn directions to the destination location. The UE may display the entire route or just the area immediately around the UE's position.

Navigation applications can include a point of interest (POI) database. While travelling along the route, the user can be presented with POIs immediately adjacent to the route. These POIs are typically presented as icons representing the category of POI, such as food, gas, hotel, attraction, and the like. However, there may be many more POIs near the route that are not displayed because they are not adjacent to the route or do not fit into any of the predefined categories. A user may have no way of knowing about these other POIs along the route. Further, the POIs that are displayed are typically not distinguished from each other according to popularity.

Accordingly, the various aspects generate a route from an origin location to a destination location based on the media density scores of locations within a threshold deviation of the original route. A media density score is based on the importance and number of the media files captured at a given location. The media captured at a location can include images and/or videos of the location.

FIG. 1 illustrates a high-level system overview according to an aspect. A user device 10, such as a cell phone, smart phone, PDA, tablet computer, automotive navigation system, or the like, includes a navigation application 11. The navigation application 11 receives an origin location 12, a destination location 13, a departure time 14, a media density threshold score 15, and a route deviation threshold 16. These criteria may be received from the user or assigned default values.

The origin location 12 is the location from which the navigation will begin. The user may define the origin location 12, or it may be defined by default. The default value is typically the user device 10's current location. The destination location 13 is the location at which the navigation will end. The user may enter the destination location 13 by typing an address, selecting a city center or zip code, selecting from a list of favorite destinations, or the like, as is known in the art. The departure time 14 is the time at which the user will begin the trip. The user may enter a future time, or it may be defined by default. The default value is the current time.

The media density score threshold 15 is the threshold media density score a location must have for the user device 10 to include the location in the generated route. The user may select the media density score threshold 15, or it may be defined by default. The default value may vary depending on the length of the route. For example, a longer route may indicate a lesser willingness to see less significant POIs, and thus the media density score threshold 15 may be set to a higher default value than for a shorter route.

The route deviation threshold 16 is the threshold distance or threshold time permitted from a default route to a location with a media density score above the media density score threshold 15. The user may select the route deviation threshold 16, or it may be defined by default. The default value may vary depending on the length of the route. For example, a longer route may indicate a greater willingness to travel further off the route to see POIs, and thus the route deviation threshold 16 may be set to a higher default value than for a shorter route.

The user device 10 also includes a routing algorithm 17 that generates a route from the origin location 12 to the destination location 13. The routing algorithm 17 generates an initial, or default, route that does not include locations with a media density score above the media density score threshold 15 and that are within the route deviation threshold 16. Such a route may be based on the fastest time, most direct route, no toll roads, and the like, as is known in the art. After the user device 10 identifies locations with a media density score above the media density score threshold 15 and within the route deviation threshold 16, the routing algorithm 17 can generate a new route that includes the identified locations. Locations with a media density score above the media density score threshold 15 and within the route deviation threshold 16 are referred to herein as "locations of interest."

The user device 10 also includes a storage 18. The storage 18 may be internal or external, and can store routes, POIs, locations of interest, maps, favorite destinations, user preferences, and the like.

The user device 10 can communicate with a server 20 over the Internet 80. Server 20 includes a scanner 22, a filter 24, a scorer 26, and a storage 28. The scanner 22 scans various websites, such as website 60, content servers, such as content server 50, and social networking sites, such as social network 70, for media files and corresponding metadata. The filter 24 filters the discovered media files to remove irrelevant ones, that is, media files that are not of locations of general interest that can be reached by automobile or by foot. The scorer 26 assigns media density scores to locations based on the importance of the media captured at the location and the number of media captured at the location.

The storage 28 stores the filtered media files, such as media file 1 30 and media file N 40. Media file 1 30 comprises metadata 31 and the actual media 36. Media 36 may be image or video media. Metadata 31 includes the location 32 at which the media file 1 30 was captured, the source 33 of the media file 1 30, the rank 34 of the media file 1 30, and the timestamp 35 at which the media file 1 30 was captured.

Media file N 40 comprises metadata 41 and the actual media 46. Media 46 may be image or video media. Metadata 41 includes the location 42 at which the media file N 40 was captured, the source 43 of the media file N 40, the rank 44 of the media file N 40, and the timestamp 45 at which the media file N 40 was captured.

The locations 32 and 42 can be the GPS coordinates at which the media files 1 30 and N 40 were captured, as is often stored in media file metadata. If, however, the GPS coordinates are not available, a rough location 32 and/or 42 can be determined from other information, such as the filename, the caption, comments about the media file 1 30 and/or N 40, and the like.

The sources 33 and 43 indicate the host of the media file 1 30 and N 40. For example, the source/host may be a news magazine website, a travel website, a photo sharing website, a social networking website, a blogging website, or the like.

The metadata 31 and 41 may include other metadata as well, such as the weather on the day the media file 1 30 or N 40 was captured, the title and/or filename of the media file 1 30 or N 40, a description of the media file 1 30 or N 40, the URL of the media files 1 30 or N 40, the brand and model of device that captured the media files 1 30 or N 40, the name of the user that captured the media file 1 30 or N 40, or the like.

The weather at the time the media file 1 30 and/or N 40 was captured can be determined by analyzing the media file 1 30 and/or N 40 itself or by parsing comments and/or captions related to the media file 1 30 and/or N 40. The weather information can also be extracted from metadata. For instance, certain camera applications automatically record weather information when a user takes a picture.

The ranks 34 and 44 indicate the importance of the media files 1 30 and N 40. The ranks 34 and 44 are based on one or more of various criteria, such as:

1. Whether the media file won an award.
2. Whether the media file was captured by a professional photographer.
3. Whether the media file was on the cover of a printed publication, such as a magazine or newspaper.
4. The number of users in a social network that have indicated a positive preference for the media file.
5. Whether one or more members of a social network connected to the user within a threshold degree of separation indicated a positive preference for the media file.
6. The number of comments on the media file.
7. The number of times the media file was forwarded to another user or posted on another website.

A positive preference for a media file may be indicated in various ways, such as by commenting on the media file, posting or re-posting the media file, forwarding the media file or a link to the media file, recommending the media file, and the like.

In an aspect, rather than storing each filtered media file in the storage 28, to save space, the storage 28 can store only the metadata. In this case, the metadata for a media file would include the URL to the original media file in case the server 20 needed to do any processing on the media file, such as determining the weather at the time it was taken.

In another aspect, server 20 is not necessary and the user device 10 includes the scanner 22, filter 24, scorer 26, and storage 28. In this aspect, to limit the amount of data processing required, the user device 10 can calculate a default route, then scan a particular set of one or more websites, content servers, and/or social networking sites for media files of locations within the deviation threshold of that route.

Server 20 can communicate with content server 50, website 60, and social network 70 over the Internet 80. Server 20 can scan each of content server 50, website 60, and social network 70 for media files, such as media files 52, 62, 74, and 78. Social network 70 includes at least user 1 72 and user N 76, each of whom have associated media files 74 and 78, respectively. User 1 72 and user N 76 may or may not be in each other's social network.

Figure 2:
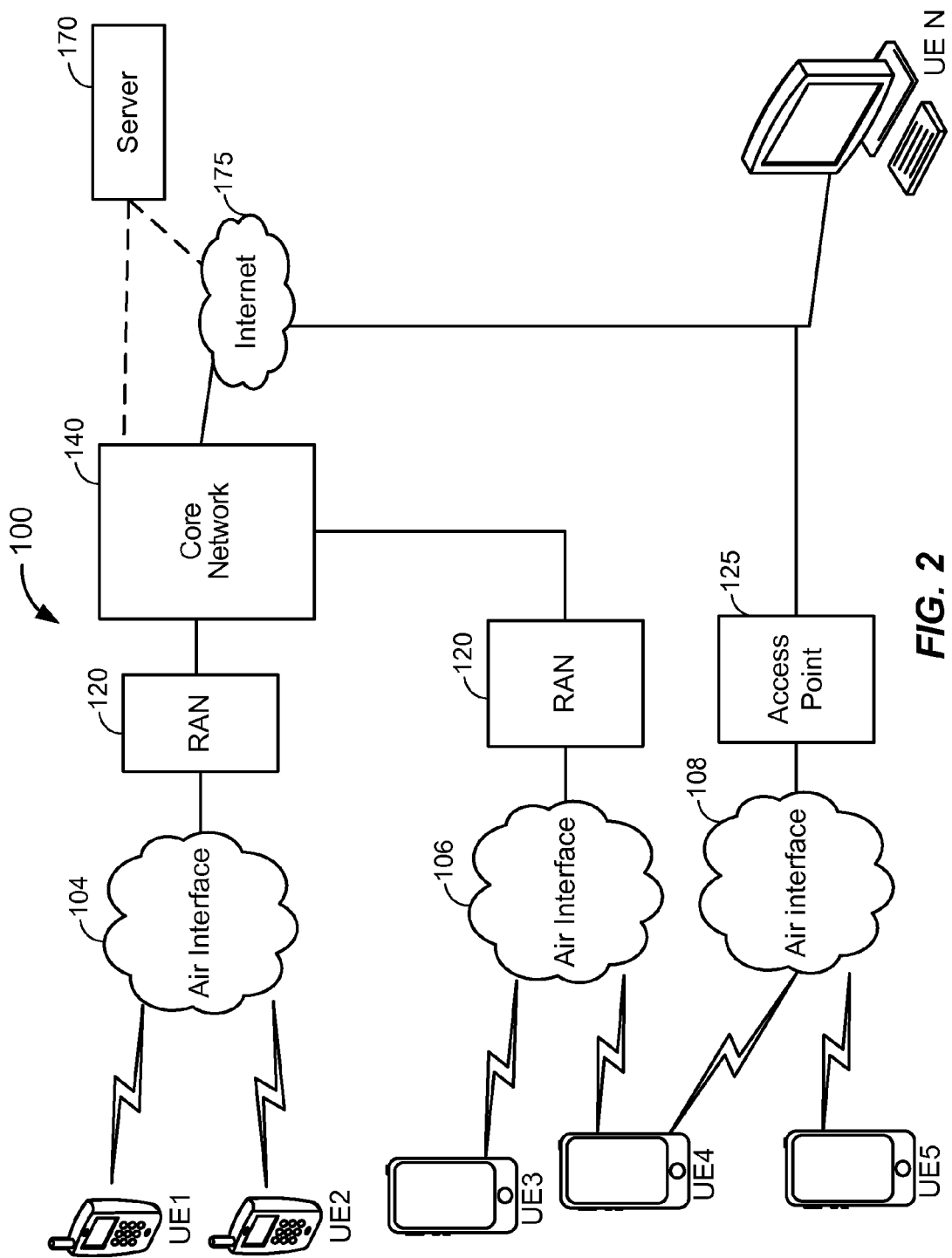
FIG. 2 illustrates a high-level system architecture of a wireless communications system in accordance with another aspect.

FIG. 2 illustrates a high-level system architecture of a wireless communications system 100 in accordance with an aspect. The wireless communications system 100 contains UEs 1 . . . N. The UEs 1 . . . N can include cellular telephones, PDAs, pagers, a laptop computer, a desktop computer, and so on. For example, in FIG. 2, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 2, UEs 1 . . . N are configured to communicate with an access network (e.g., the RAN 120, an access point 125, etc.) over a physical communications interface or layer, shown in FIG. 2 as air interfaces 104, 106, 108 and/or a direct wired connection. The air interfaces 104 and 106 can comply with a given cellular communications protocol (e.g., CDMA (Code Division Multiple Access), EV-DO (Evolution-Data Optimized), eHRPD (Evolved High Rate Packet Data), GSM (Global System for Mobile Communications), EDGE (Enhanced Data Rates for GSM Evolution), W-CDMA (Wideband CDMA), LTE (Long Term Evolution), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 2 for the sake of convenience). In FIG. 2, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 2, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 3:
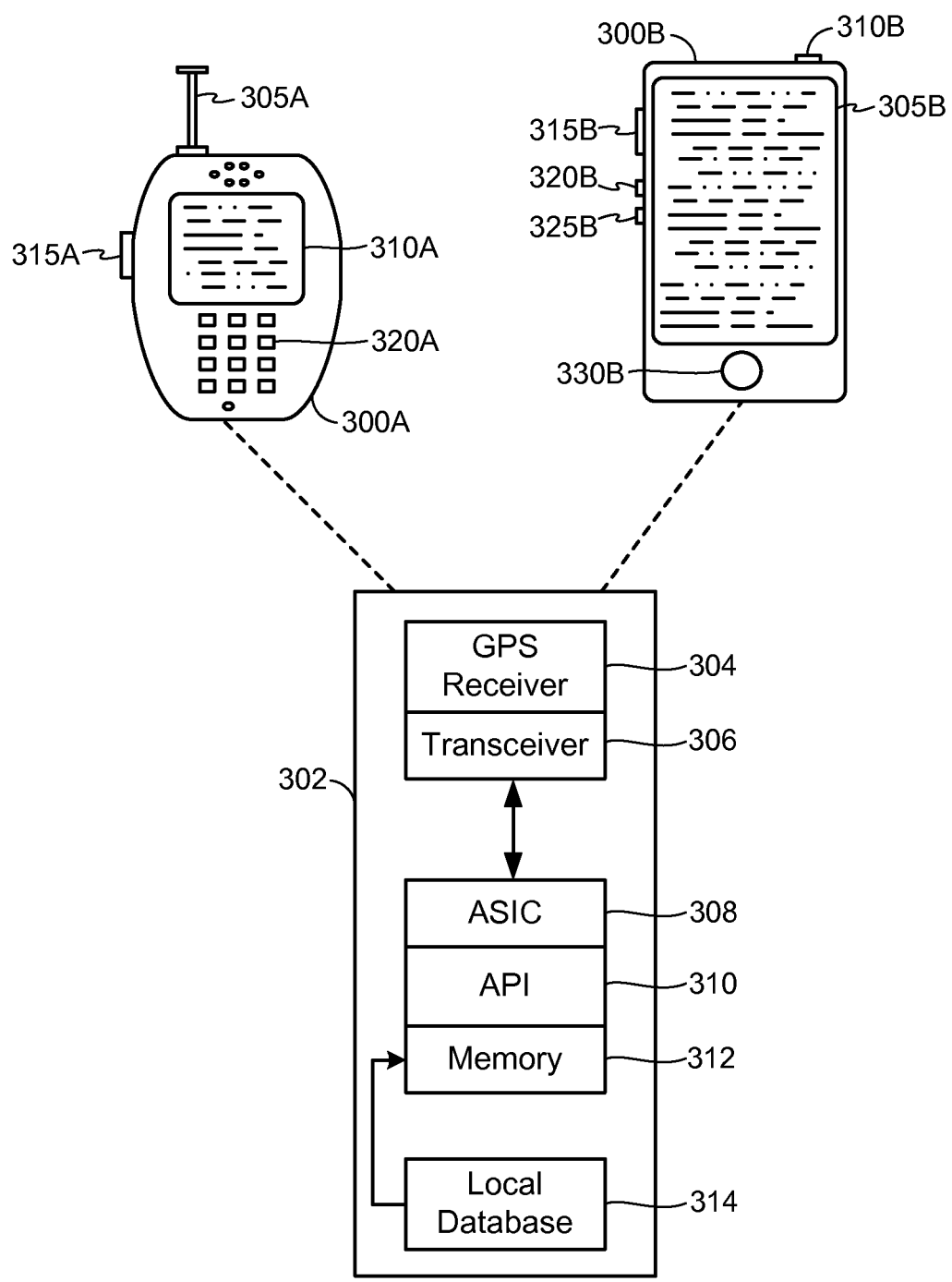
FIG. 3 illustrates examples of user equipment in accordance with another aspect.

FIG. 3 illustrates examples of UEs in accordance with aspects of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., GPS antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a GPS receiver 304 and a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of aspects of aspects of the disclosure.

Figure 4:
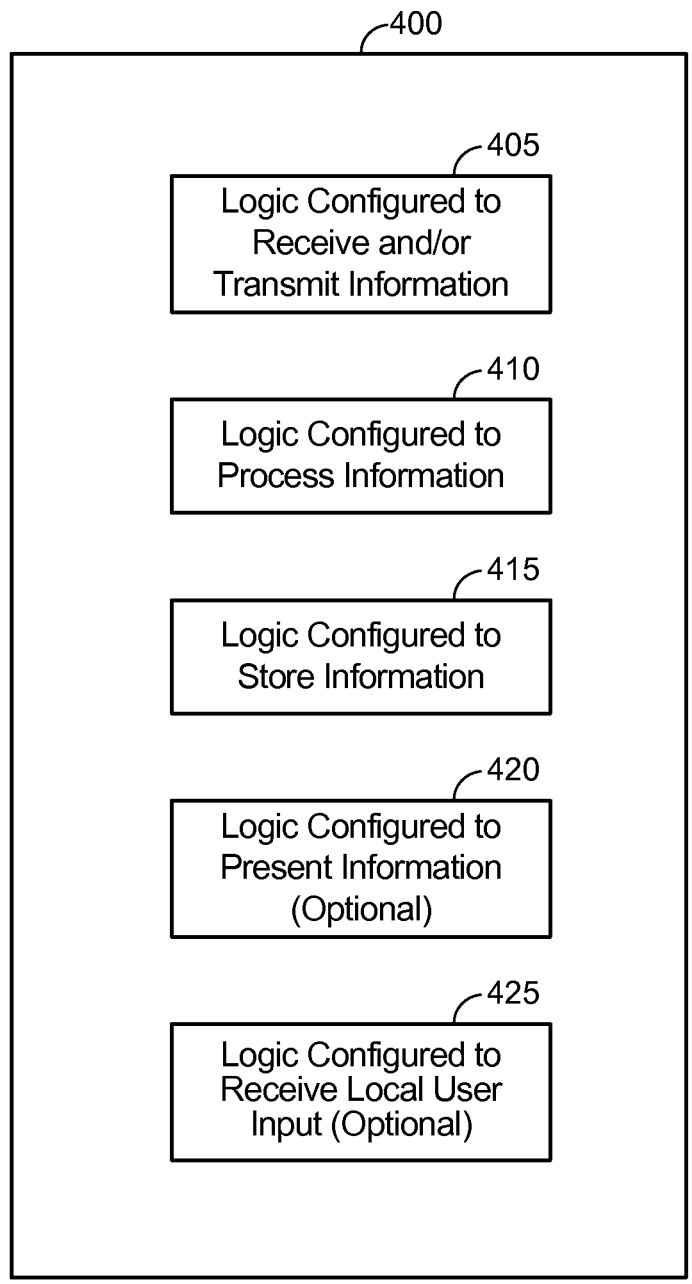
FIG. 4 illustrates a communication device that includes logic configured to perform functionality in accordance with yet another aspect.

FIG. 4 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 2.

Referring to FIG. 4, the communication device 400 includes logic configured to receive and/or transmit information 405. In an example, if the communication device 400 corresponds to a wireless communications device (e.g., UE 300A or 300B), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the application 170), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, EPROM, EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 5:
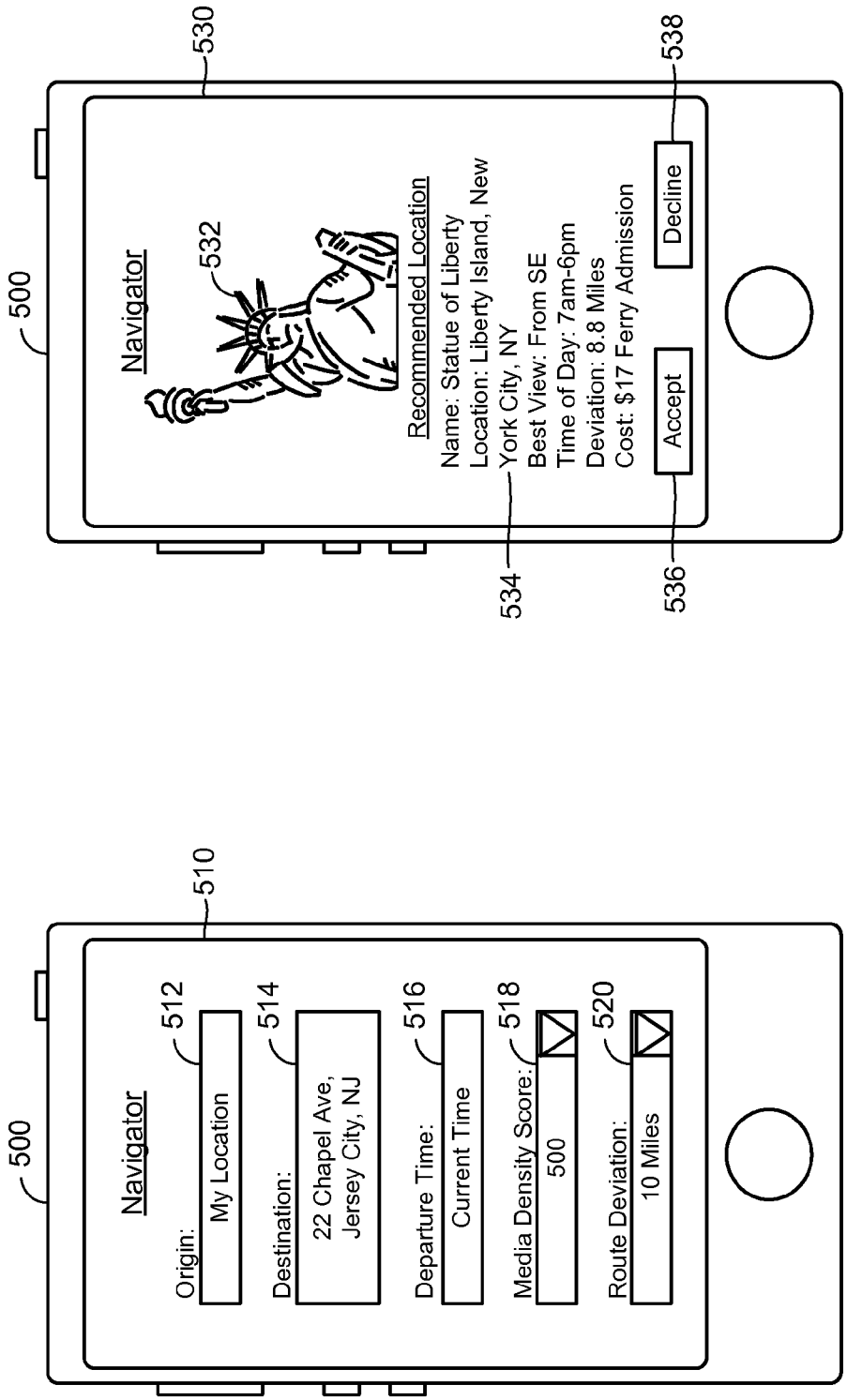
FIG. 5 illustrates two exemplary screens of a UE according to an implementation.

FIG. 5 illustrates two exemplary screens 510 and 530 of a user device 500 according to an aspect. The user device 500 is illustrated as a smart phone, but as is apparent, it may instead be any cell phone, a PDA, a tablet computer, an automotive navigation system, or the like.

Screen 510 is an exemplary user preference screen of the navigation application. A user can specify the origin location in field 512. In the example of FIG. 5, field 512 is populated with "My Location," indicating that the user wishes to start navigating from his or her current location. This can also be the default value for field 512.

The user can specify the destination location in field 514. In the example of FIG. 5, field 514 is populated with a specific address. In other aspects, it may be populated with the name of a favorite place, the name of a city, a crossroads of two roads, or the like, as is known in the art.

The user can specify the time he or she will begin travelling in field 516. In the example of FIG. 5, field 516 is populated with "Current Time," indicating that the user is currently beginning or is already on the trip. This can also be the default value for field 516. The user may alternatively specify a time in the future. This is useful when the user is planning a trip in advance and wants to see what locations of interest may be along the route.

The user can specify the media density score threshold in field 518. This field indicates the minimum media density score a location must have to be a location of interest and for the navigation application to re-route the original or default route to include the location. In the example of FIG. 5, the user has specified a media density score of "500." This may be selected from a drop down menu, as in FIG. 5, by using a slider bar, a list of values associated with radio buttons, or any other convenient means for selecting one of multiple values.

The user can specify the route deviation threshold in field 520. This field indicates the maximum deviation from the original or default route that the user is willing to travel to see a location of interest. The deviation may be a distance or a time. In the example of FIG. 5, the user has selected "10 Miles." Like field 518, this value may be selected from a drop down menu, as in FIG. 5, by using a slider bar, a list of values associated with radio buttons, or any other convenient means for selecting one of multiple values.

Screen 530 is an exemplary location of interest screen of the navigation application. Screen 530 may be displayed after the user enters the preferences shown on screen 510 and the navigation application identifies locations matching the user's preferences (i.e. locations of interest). The navigation application may prompt the user to accept, using Accept button 536, or decline, using Decline button 538, the proposed locations of interest. After determining which locations of interest the user wishes to see, the navigation application can re-route the original or default route to include those locations of interest.

The navigation application can additionally or alternatively display the location of interest screen 530 when the user gets within a threshold distance of the location of interest. The threshold distance can be, for example, the route deviation threshold specified in field 520. Alternatively, rather than using a fixed threshold distance from the location of interest, the navigation application can display the location of interest screen 530 a threshold distance before the user would have to deviate from the original or default route. This way, if the user changes his or her mind about seeing the location of interest, the user can stay on the original route rather than follow any portion of the route to the location of interest.

The location of interest screen 530 can include an image 532 of the location of interest and information 534 describing the location of interest. Information 534 can include the name and location of the location of interest, the direction of the best view of the location of interest, the best time of day to see the location of interest, the route deviation to the location of interest, and/or the cost of seeing the location of interest.

The best view is particularly useful where a location of interest may be viewed from many angles, while the best time of day is useful so that the user can plan to be at the location of interest at that time. The cost of seeing the location of interest can include entrance fees, tolls, transportation fees, and the like. In the example of FIG. 5, the information 534 includes a ferry admission of $17.00.

Figure 6:
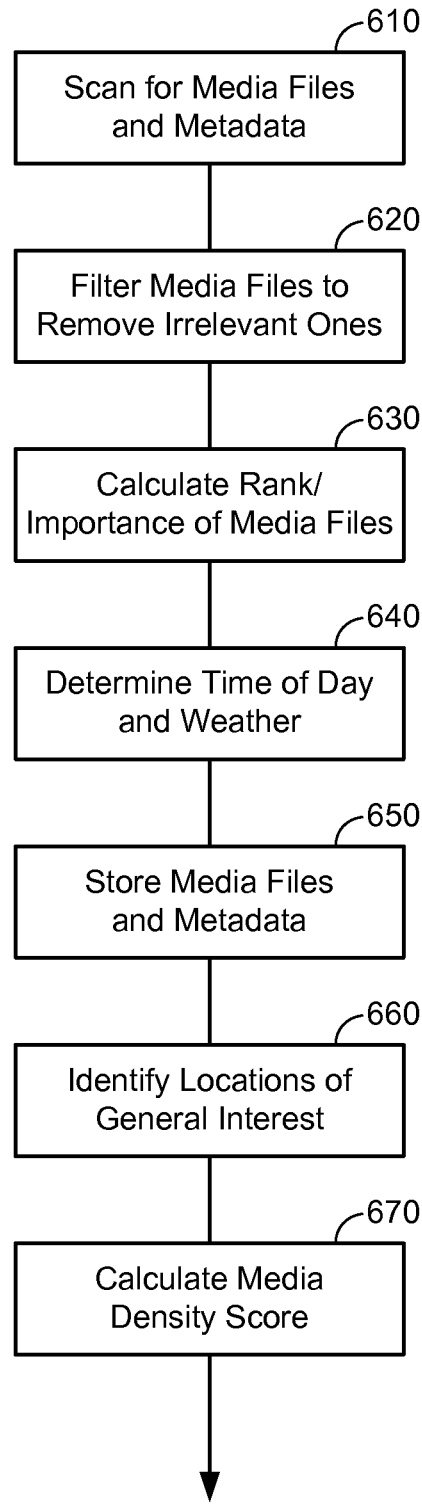
FIG. 6 illustrates an exemplary flow of an aspect performed at a user device or a server.

FIG. 6 illustrates an exemplary flow of an aspect performed at a user device, such as user device 10, or a server, such as server 20. In the flow of FIG. 6, the user device or server identifies locations of general interest and calculates media density scores for those locations based on the number and importance of the media files captured there.

At 610, the user device or server scans various websites, content servers, and social networking sites for media files. If a server is performing the flow of FIG. 6, the server may continuously scan for media files, similar to a web crawler. If a user device is performing the flow of FIG. 6, the user device may scan for media files during off-peak times, and/or may only scan for media files captured at locations within a threshold distance of the user, for example, 100 miles. This reduces the necessary processing resources. Alternatively, the user device may wait until the user opens the navigation application and enters the origin and destination of a route. The user device can then calculate a default route and scan for media files captured within the deviation threshold of that route. To further reduce the processing requirements of the user device, the user device, or even the server, can scan only a particular set of one or more websites, content servers, and/or social networking sites for media files.

At 620, the user device or server filters the discovered media files to remove irrelevant ones. Irrelevant media files are media files that are not of locations of general interest that can be reached by automobile. The user device or server can determine whether a media file is relevant or irrelevant based on a number of factors, such as the source of the media file, the name, caption, or description of the media file, comments related to the media file, and the like.

At 630, the user device or server calculates the rank, or importance, of each of the relevant media files. As discussed above with reference to ranks 34 and 44 of FIG. 1, the rank is based on various factors, such as whether the media file won an award, whether the media file was captured by a professional photographer, whether the media file was on the cover of a printed publication, the number of users in a social network that have indicated a positive preference for the media file, whether one or more members of a social network connected to the user within a threshold degree of separation indicated a positive preference for the media file, the number of comments on the media file, the number of times the media file was forwarded to another user or posted on another website, and the like. This information can be determined from a number of sources, such as the media file's metadata, the source of the media file, the name, caption, or description of the media file, comments related to the media file, and the like.

The more factors a given media file has, the greater its importance. Additionally, certain factors may carry more weight than others. For example, a member of a social network within one degree of separation from the user indicating a positive preference for a media file would be given more weight than another member of the social network within two degrees of separation indicating a positive preference for the media file.

At 640, the user device or server determines the time of day each media file was captured and the weather at the time the media file was captured. The time of day can be determined from the timestamp on the media file. If there is no timestamp, the user device or server can analyze the media file to determine at least whether or not it was taken during the day or at night. The weather can be determined in various ways, such as by analyzing the media file itself, parsing comments and/or captions related to the media file, extracting the weather information from the media file's metadata, looking up the weather at the GPS coordinates of the media file for the day indicated by the timestamp, and the like.

At 650, the user device or server stores the media files, including their metadata, and any additionally determined metadata, such as the weather at the time of capture. The media files may be stored in a database, as is known in the art. The metadata may be stored in a table for ease of access, and linked to the actual media. The media files and additional metadata can be stored in any number of ways, and the disclosure is not limited to the examples given here.

At 660, the user device or server identifies locations of general interest. The user device or server identifies a location of general interest based on the locations at which the media files were captured. That is, if a threshold number of media files were captured within a threshold distance of a given geographic location, that location is considered a location of general interest. The threshold number of media files can be configured by the user or set automatically. The lower the threshold, the more obscure the location, and the less likely it is that the location is actually a location of general interest. The threshold distance can also be configured by the user or set automatically. The larger the threshold, the less likely it is that all the media files capture the same location, and thus the less likely it is that the location is a location of general interest.

At 670, the user device or server calculates the media density scores for the identified locations. A media density score for a location of general interest is calculated based on the number of media files captured at the location and the ranks of those media files (as calculated in 630). The more media files captured at the location, and the more of those media files having a high rank, the higher the media density score of the location.

In an aspect, because the server is continuously scanning for media files, the media density scores can be updated while the user is travelling. This can change whether or not a give location would have been recommended in the first place. That is, a change in media density scores may cause certain locations to be recommended that were not recommended initially and others to not be recommended that were. The server can send the new recommendations, including recommendations to remove previously recommended locations of interest, to the user device, which can notify the user. The user can choose to accept or deny the new recommendations, as discussed above with reference to FIG. 5. If the user accepts any of the new recommendations, the user device will incorporate them into the route.

In an aspect, the media density score of a location within the route deviation threshold can be increased if a social network contact of the user is at that location. Whether a contact of the user is at a given location can be determined from the shared social network, as members often share their location with contacts in their social network. The media density score can be increased a certain amount if the contact is within one degree of separation from the user, a lesser amount if the contact is within two degrees of separation from the user, and so on. The user may be alerted about the presence of the contact at the location if the increase in the media density score is sufficient to raise the media density score above the media density score threshold. Alternatively, the user can be notified whenever a contact is at a location within the route deviation threshold, regardless of whether the location would otherwise be recommended as a location of interest.

In an aspect, the user can set various interests that influence the media density score for a location of interest. For instance, the user can set a preference indicating that he or she would like to see rock formations along the route. Accordingly, if any locations within the route deviation threshold are rock formations, they will be given a higher media density score than non-rock formation locations.

Figure 7:
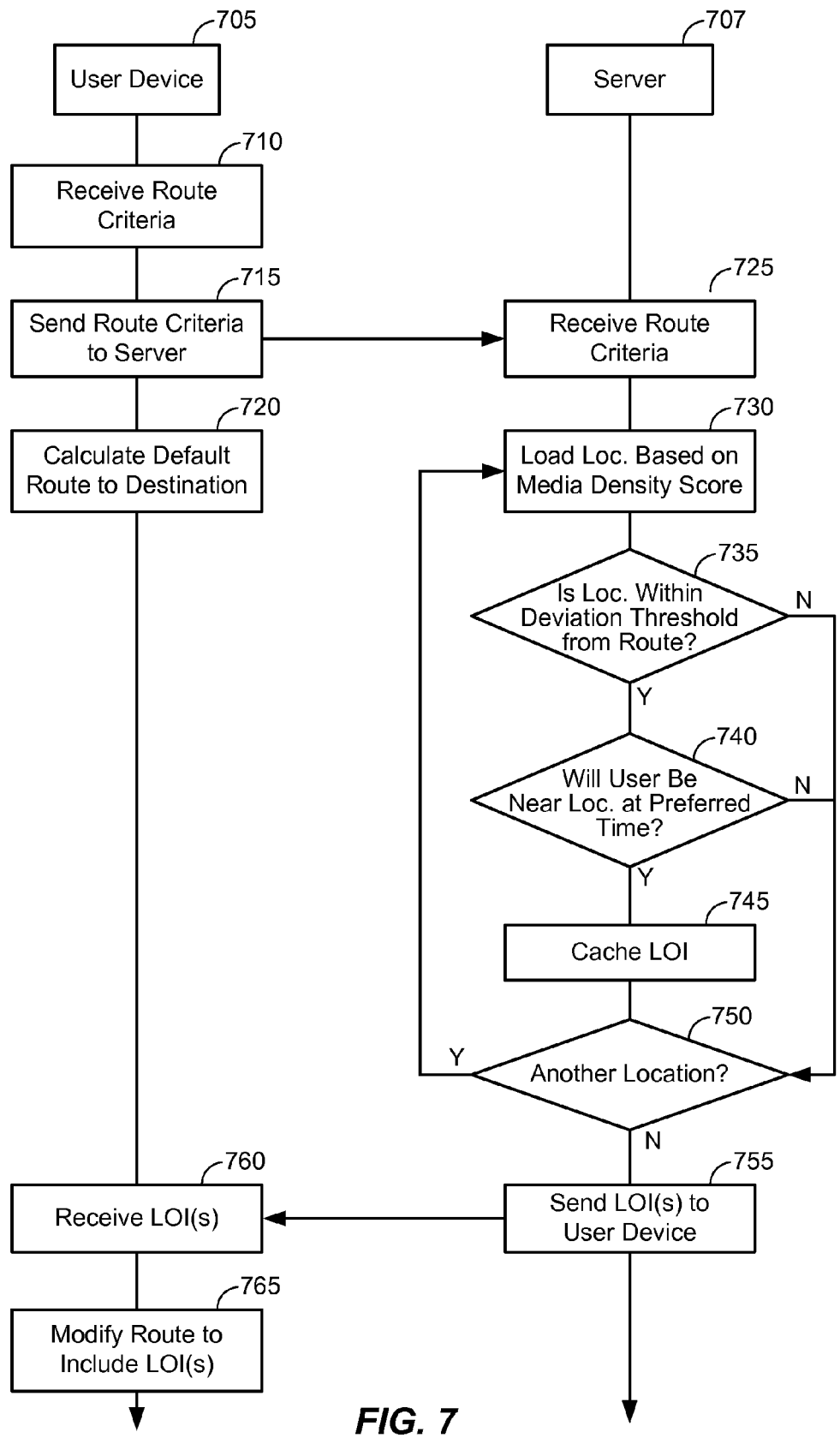
FIG. 7 illustrates an exemplary flow between a user device and a server according to an aspect.

FIG. 7 illustrates an exemplary flow between a user device 705 and a server 707 according to an aspect. In the flow of FIG. 7, the user device 705 communicates with the server 707 to identify locations of interest in order to plan a travel route.

At 710, the user device 705 receives the route criteria. The route criteria can include the origin, destination, departure time, media density score threshold, and route deviation threshold. At 715, the user device 705 sends the route criteria to the server 707. The user device 705 may send the route criteria to the server 707 over an air interface, such as a WiFi or cellular network, as is known in the art.

At 720, the user device 705 determines a default route to the destination. This route can be calculated based on various user preferences, such as the fastest time, the most direct route, no tolls, no highways, and the like, as is known in the art.

At 725, the server 707 receives the route criteria. At 730, the server 707 loads a first location (abbreviated "Loc." in FIG. 7) with a media density score above the received media density score threshold. At 735, the server 707 determines whether the location is within the received route deviation threshold. If it is not, then at 750, the server determines whether there is another location to process. If there is, the flow returns to 730, and the server 707 loads the next location.

If, however, the location is within the route deviation, then at 740, the server determines whether the user device 705 will be within a threshold distance of the location during the preferred time to visit that location. The server can determine the preferred time to visit a location based on various factors, such as the timestamps of the media files captured at the location, whether the media file was captured during the day or at night, and the like. For example, if the majority of the media files were captured around a particular time, such as 6:00 pm, or during the day versus at night, the server 707 will determine that that is the preferred time to visit the location.

The server 707 then determines whether the user will be near the location at that time. The server 707 can calculate the time it will take the user to reach the location, add the departure time (if not set to the current time) to the travel time, and determine whether the user will be near the location at the preferred time. Alternatively, the server 707 may receive the route, and thus the time it will take the user to reach the location, from the user device 705 as part of the route criteria.

If the user will not be within a threshold distance of the location at the preferred time, then at 750, the server 707 determines whether there is another location to process. If there is another location to process, the flow returns to 730, and the server 707 loads the next location.

The server 707 does not suggest the location if the user will not or cannot be there at the preferred time because part of what makes the location a location of interest is being there when the location can be properly viewed. For example, if the location is Sunset Cliffs, San Diego and the majority of media files captured there are captured around 6:00 pm, the user would likely not be interested in visiting if he or she will be there around noon.

If the user will be within the threshold distance of the location at the preferred time, then at 745, the server 707 caches the location as a location of interest. At 750, the server determines whether there is another location to process. If there is, the flow returns to 730, and the server 707 loads the next location. If there is not, then at 755, the server 707 sends the cached locations of interest to the user device 705. At 760, the user device 705 receives the locations of interest.

At 765, the user device 705 modifies the default route to include the received locations of interest. Based on the user preferences, the user device 705 may automatically generate a new route that includes all the received locations of interest. Alternatively, the user device 705 may display each received location of interest to the user in turn and allow the user to accept or decline the location of interest. The user device 705 can then generate a new route that includes the accepted locations of interest.

Figure 8:
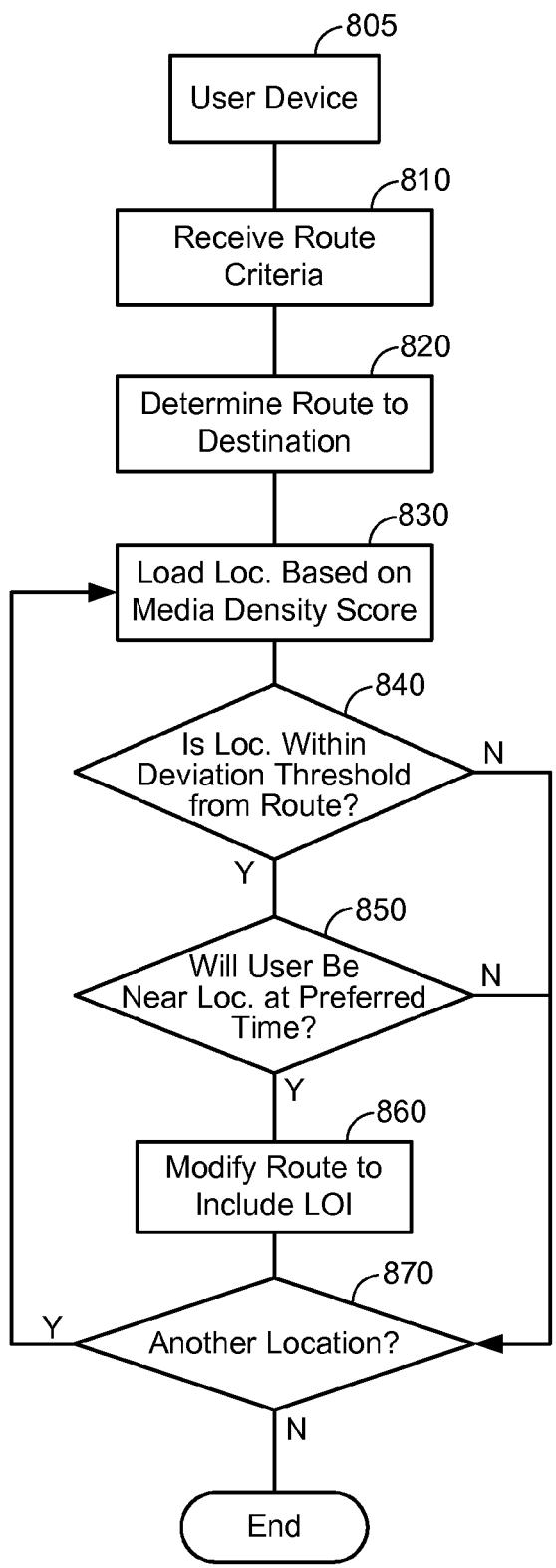
FIG. 8 illustrates an exemplary flow of an aspect performed at a user device.

FIG. 8 illustrates an exemplary flow of an aspect performed at a user device 805. In the flow of FIG. 8, the user device 805 identifies locations of interest in order to plan a travel route. The flow is similar to the flow illustrated in FIG. 7, except that the entire flow occurs at the user device 805.

At 810, the user device 805 receives the route criteria. The route criteria can include the origin, destination, departure time, media density score threshold, and route deviation threshold. At 820, the user device 805 determines a default route to the destination. This route can be calculated based on various user preferences, such as the fastest time, the most direct route, no tolls, no highways, and the like, as is known in the art.

At 830, the user device 805 loads a first location of interest (abbreviated as "Loc." in FIG. 8) with a media density score above the selected media density score threshold. At 840, the user device 805 determines whether the location is within the selected route deviation threshold. If it is not, then at 870, the user device 805 determines whether there is another location to process. If there is, the flow returns to 830, and the user device 805 loads the next location.

If, however, the location is within the route deviation threshold, then at 850, the server determines whether the user device 805 will be within a threshold distance of the location during the preferred time to visit that location. Like server 707 of FIG. 7, the user device can determine the preferred time to visit a location based on various factors, such as the timestamps of the media files captured at the location, whether the media file was captured during the day or at night, and the like.

The user device 805 then determines whether the user will be near the location at that time. The user device 805 can calculate the time it will take the user to reach the location of interest, add the departure time (if not set to the current time) to the travel time, and determine whether the user will be near the location at the preferred time.

Additionally, the user device can determine if the weather at the time the user will be at the location will be appropriate for the location. For instance, if the location is an outdoor location and it is predicted to rain when the user arrives, the user device may not recommend that location as a location of interest. This weather determination can be performed dynamically. That is, the user device can check the weather periodically during the trip, and if it becomes too bad to properly view the location of interest, the user device can notify the user and remove the location from the route. Alternatively, the user can override this recommendation and continue to the location of interest.

If the user will not be within a threshold distance of the location at the preferred time, then at 870, the user device 805 determines whether there is another location to process. If there is, the flow returns to 830, and the user device 805 loads the next location. If the user will be within the threshold distance of the location at the preferred time, then at 860, the user device 805 modifies the route to include the location as a location of interest. Based on the user preferences, the user device 805 may automatically generate a new route that includes the identified location of interest. Alternatively, the user device 805 may display the identified location of interest to the user and allow the user to accept or decline the location of interest. The user device 805 can then generate a new route that includes the accepted locations of interest.

At 870, the user device 805 determines whether there is another location to process. If there is, the flow returns to 830 and the user device 805 loads the next location. If there is not, then the flow ends.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for recommending locations of interest along a route from an origin to a destination, comprising:
   calculating, by a processor of a device, the route from the origin to the destination for display on a user interface of a user device;
   determining, by the processor of the device, a recommendation of a location of interest in response to calculating the route, wherein the location of interest is a location with a media density score greater than a threshold and within a range of deviation from the route, and wherein the media density score is calculated based on a number of one or more media files related to the location of interest and a ranking of each of the one or more media files, wherein each ranking of the one or more media files is based on one or more factors that indicate an importance of a media file of the one or more media files to other users besides a user of the user device; and
   displaying, by the device, the recommendation on the user interface of the user device.

2. The method of claim 1, wherein the calculating the route comprises calculating a fastest route between the origin and the destination.

3. The method of claim 1, wherein the range of deviation includes at least one of a deviation in distance or a deviation in time from a point on the route to the location of interest.

4. The method of claim 1, further comprising:
   modifying the route to include the location of interest.

5. The method of claim 4, further comprising:
   before the modifying the route, displaying a notification to the user that describes the location of interest; and
   receiving approval from the user to modify the route.

6. The method of claim 1, wherein the determining the recommendation comprises:
   determining whether the user device travelling the route will be within a threshold distance of the location of interest at a preferred time to visit the location of interest; and
   based on determining that the user will be within the threshold distance at the preferred time, recommending the location of interest.

7. The method of claim 1, wherein the determining the recommendation comprises:
   determining a time at which the user device travelling the route will arrive at the location of interest;
   determining a weather forecast for the location of interest for the time at which the user will arrive at the location of interest; and
   based on the weather forecast being a preferred weather forecast for the location of interest, recommending the location of interest.

8. The method of claim 1, wherein the determining the recommendation comprises:
   determining whether a social contact of the user travelling the route is at the location of interest; and
   based on the social contact being at the location of interest, recommending the location of interest.

9. The method of claim 8, wherein the social contact is in a same social network as the user.

10. The method of claim 1, wherein the determining the recommendation comprises:
    determining whether an interest of the user travelling the route is related to the location of interest; and
    based on the location of interest being related to the user interest, recommending the location of interest.

11. The method of claim 1, further comprising:
    dynamically updating the route based on inter-route conditions.

12. The method of claim 11, wherein the inter-route conditions include at least one of:
    a change of weather;

a change of an estimated time of arrival to the location of interest;
an updated media density score for the location of interest; or
a presence of a social contact in a geographic region along the route.

13. The method of claim 11, wherein the dynamically updating the route comprises:
determining whether a media density score for a location has increased above the threshold while the user device is traveling along the route; and
based on the media density score having increased above the threshold, recommending the location as a location of interest.

14. The method of claim 11, wherein the dynamically updating the route comprises:
determining whether the media density score for the location of interest has decreased below the threshold; and
based on the media density score having decreased below the threshold, retracting the recommendation of the location of interest.

15. The method of claim 14, wherein the retracting the recommendation comprises notifying the user travelling the route that the location of interest is no longer a location of interest.

16. The method of claim 14, wherein the retracting the recommendation comprises removing the location of interest from the route.

17. The method of claim 1, wherein the media density score of the location is determined based on at least one of:
a ratio of positive to negative recommendations of the location;
a time of year;
a time of day;
a weather condition; or
a number of locations in a specific geographic area.

18. The method of claim 1, wherein a number of recommendations are based on contacts in a social network of the user.

19. The method of claim 1, further comprising:
receiving the threshold for the media density score; and
receiving the range of deviation from the route.

20. The method of claim 19, wherein the determining the recommendation comprises:
calculating the media density score for the location; and
identifying the location as the location of interest based on the media density score being above the threshold and within the range of deviation.

21. The method of claim 19, wherein the device comprises the user device, and wherein the threshold and the range of deviation are received from the user.

22. The method of claim 1, wherein the device comprises a server.

23. The method of claim 1, wherein the one or more media files comprise one or more images or videos of the location of interest.

24. The method of claim 1, wherein the one or more factors that indicate the importance of the media file comprise one or more of whether the media file won an award, whether the media file was captured by a professional photographer, whether the media file was on a cover of a printed publication, a number of users in a social network that have indicated a positive preference for the media file, whether one or more members of a social network within a threshold degree of separation of a user of the user device indicated a positive preference for the media file, a number of comments on the media file, a number of times the media file was forwarded to another user, or a number of times the media file was posted on another website.

25. An apparatus for recommending locations of interest along a route from an origin to a destination, comprising:
at least one processor configured to:
calculate the route from the origin to the destination for display on a user interface of a user device;
determine a recommendation of a location of interest in response to calculation of the route, wherein the location of interest is a location with a media density score greater than a threshold and within a range of deviation from the route, and wherein the media density score is calculated based on a number of one or more media files related to the location of interest and a ranking of each of the one or more media files, wherein each ranking of the one or more media files is based on one or more factors that indicate an importance of a media file of the one or more media files to other users besides a user of the user device; and
cause a user interface of the user device to display the recommendation.

26. The apparatus of claim 25, wherein the at least one processor is further configured to:
modify the route to include the location of interest.

27. The apparatus of claim 26, wherein the at least one processor is further configured to:
cause the user interface of the user device to display a notification to the user that describes the location of interest before modification of the route; and
receive approval from the user to modify the route.

28. The apparatus of claim 25, wherein the at least one processor being configured to determine the recommendation comprises the at least one processor being configured to:
determine whether the user device traveling the route will be within a threshold distance of the location of interest at a preferred time to visit the location of interest; and
recommend the location of interest based on a determination that the user will be within the threshold distance.

29. The apparatus of claim 25, wherein the at least one processor being configured to determine the recommendation comprises the at least one processor being configured to:
determine a time at which the user device travelling the route will arrive at the location of interest;
determine a weather forecast for the location of interest for the time at which the user will arrive at the location of interest; and
recommend the location of interest based on the weather forecast being a preferred weather forecast for the location of interest.

30. The apparatus of claim 25, wherein the at least one processor being configured to determine the recommendation comprises the at least one processor being configured to:
determine whether a social contact of the user travelling the route is at the location of interest; and
recommend the location of interest based on the social contact being at the location of interest.

31. The apparatus of claim 30, wherein the social contact is in a same social network as the user.

32. The apparatus of claim 25, wherein the at least one processor being configured to determine the recommendation comprises the at least one processor being configured to:
  determine whether an interest of the user travelling the route is related to the location of interest; and
  recommend the location of interest based on the location of interest being related to the user interest.

33. The apparatus of claim 25, wherein the at least one processor is further configured to:
  dynamically update the route based on inter-route conditions.

34. The apparatus of claim 33, wherein the at least one processor being configured to dynamically update the route comprises the at least one processor being configured to:
  determine whether the media density score for the location of interest has decreased below the threshold; and
  retract the recommendation of the location of interest based on the media density score having decreased below the threshold.

35. The apparatus of claim 34, wherein the at least one processor being configured to retract the recommendation comprises the at least one processor being configured to cause the user interface of the user device to notify the user travelling the route that the location of interest is no longer a location of interest.

36. The apparatus of claim 34, wherein the at least one processor being configured to retract the recommendation comprises the at least one processor being configured to remove the location of interest from the route.

37. The apparatus of claim 33, wherein the inter-route conditions include at least one of:
  a change of weather;
  a change of an estimated time of arrival to the location of interest;
  an updated media density score for the location of interest; or
  a presence of a social contact in a geographic region along the route.

38. The apparatus of claim 33, wherein the at least one processor being configured to dynamically update the route comprises the at least one processor being configured to:
  determine whether a media density score for a location has increased above the threshold while the user device is traveling along the route; and
  recommend the location of interest based on the media density score having increased above the threshold.

39. The apparatus of claim 25, wherein the media density score of the location is determined based on at least one of:
  a ratio of positive to negative recommendations of the location;
  a time of year;
  a time of day;
  a weather condition; or
  a number of locations in a specific geographic area.

40. The apparatus of claim 25, wherein a number of recommendations are based on contacts in a social network of the user.

41. The apparatus of claim 25, wherein the at least one processor is further configured to:
  receive the threshold for the media density score; and
  receive the range of deviation from the route.

42. The apparatus of claim 41, wherein the at least one processor being configured to determine the recommendation comprises the at least one processor being configured to:
  calculate the media density score for the location; and
  identify the location as the location of interest based on the media density score being above the threshold and within the range of deviation.

43. The apparatus of claim 41, wherein the apparatus is the user device, and wherein the threshold and the range of deviation are received from the user.

44. The apparatus of claim 25, wherein the apparatus is a server.

45. The apparatus of claim 25, wherein the at least one processor being configured to calculate the route comprises the at least one processor being configured to calculate a fastest route between the origin and the destination.

46. The apparatus of claim 25, wherein the range of deviation includes at least one of a deviation in distance or a deviation in time from a point on the route to the location of interest.

47. An apparatus for recommending locations of interest along a route from an origin to a destination, comprising:
  means for calculating the route from the origin to the destination for display on a user interface of a user device;
  means for determining a recommendation of a location of interest in response to calculation of the route, wherein the location of interest is a location with a media density score greater than a threshold and within a range of deviation from the route, and wherein the media density score is calculated based on a number of one or more media files related to the location of interest and a ranking of each of the one or more media files, wherein each ranking of the one or more media files is based on one or more factors that indicate an importance of a media file of the one or more media files to other users besides a user of the user device; and
  means for displaying the recommendation on the user interface of the user device.

48. A non-transitory computer-readable medium for recommending locations of interest along a route from an origin to a destination, comprising:
  at least one instruction to cause a device to calculate the route from the origin to the destination for display on a user interface of a user device;
  at least one instruction to cause the device to determine a recommendation of a location of interest in response to calculation of the route, wherein the location of interest is a location with a media density score greater than a threshold and within a range of deviation from the route, and wherein the media density score is calculated based on a number of one or more media files related to the location of interest and a ranking of each of the one or more media files, wherein each ranking of the one or more media files is based on one or more factors that indicate an importance of a media file of the one or more media files to other users besides a user of the user device; and
  at least one instruction to cause the device to display the recommendation on the user interface of the user device.

* * * * *